(12) United States Patent
Saito et al.

(10) Patent No.: US 7,069,302 B2
(45) Date of Patent: *Jun. 27, 2006

(54) INTERNET FACSIMILE AND E-MAIL RECEPTION METHOD

(75) Inventors: Kyoji Saito, Kawasaki (JP); Kiyoshi Toyoda, Kunitachi (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 119 days.

This patent is subject to a terminal disclaimer.

(21) Appl. No.: 10/617,856

(22) Filed: Jul. 14, 2003

(65) Prior Publication Data

US 2004/0010558 A1    Jan. 15, 2004

Related U.S. Application Data

(63) Continuation of application No. 09/099,528, filed on Jun. 18, 1998, now Pat. No. 6,618,749.

(30) Foreign Application Priority Data

Jun. 20, 1997    (JP)    ................... 9-180528

(51) Int. Cl.
    *G06F 15/16*    (2006.01)
(52) U.S. Cl. ..................... 709/206; 709/217
(58) Field of Classification Search ........ 709/204–207, 709/217, 246, 245; 358/402, 426, 408, 1, 358/403; 379/93; 455/422; 715/751, 530
    See application file for complete search history.

(56) References Cited

U.S. PATENT DOCUMENTS

| | | | |
|---|---|---|---|
| 5,150,221 A * | 9/1992 | Shima | ........................ 358/403 |
| 5,283,856 A | 2/1994 | Gross et al. | |
| 5,398,293 A | 3/1995 | Sato et al. | |
| 5,406,557 A | 4/1995 | Baudoin | |
| 5,410,417 A * | 4/1995 | Kuznicki et al. | ...... 358/426.02 |
| 5,467,201 A | 11/1995 | Fan | |
| 5,479,411 A | 12/1995 | Klein | |
| 5,533,139 A | 7/1996 | Parker et al. | |
| 5,555,346 A | 9/1996 | Gross et al. | |
| 5,579,472 A * | 11/1996 | Keyworth et al. | .......... 715/751 |

(Continued)

FOREIGN PATENT DOCUMENTS

EP    0420779    4/1990

(Continued)

OTHER PUBLICATIONS

Network Working Group K. Toyoda Request for Comments: 2305 H. www.tzi.de/~cabo/pdfrfc/rfc2305.txt.pdf.*

(Continued)

*Primary Examiner*—Thong Vu
(74) *Attorney, Agent, or Firm*—Greenblum & Bernstein, P.L.C.

(57) ABSTRACT

An Internet facsimile apparatus for receiving e-mail data, is connected to a computer network. The Internet facsimile apparatus comprises an e-mail receiver that receives e-mail data transmitted via the computer network. The e-mail data includes a header, document information and image information. Further, the Internet facsimile apparatus comprises a determiner that determines whether or not the document information contains a predetermined data. This predetermined data indicates that the e-mail data is data which was transmitted from an Internet facsimile apparatus. A printer in the Internet facsimile apparatus prints the entire received e-mail data when the determiner determines that the document information does not contain the predetermined data, and prints only the image information when the determiner determines that the document information contains the predetermined data.

10 Claims, 10 Drawing Sheets

U.S. PATENT DOCUMENTS

| | | | |
|---|---|---|---|
| 5,608,786 A | 3/1997 | Gordon | |
| 5,613,108 A | 3/1997 | Morikawa | |
| 5,625,465 A | 4/1997 | Lech et al. | |
| 5,627,764 A | 5/1997 | Schutzman et al. | |
| 5,754,306 A | 5/1998 | Taylor et al. | |
| 5,760,916 A * | 6/1998 | Dellert et al. | 358/408 |
| 5,765,170 A | 6/1998 | Morikawa | |
| 5,765,172 A | 6/1998 | Morikawa | |
| 5,767,985 A * | 6/1998 | Yamamoto et al. | 358/402 |
| 5,793,498 A | 8/1998 | Scholl et al. | |
| 5,802,253 A | 9/1998 | Gross et al. | |
| 5,809,415 A * | 9/1998 | Rossmann | 455/422.1 |
| 5,812,278 A | 9/1998 | Toyoda et al. | |
| 5,819,110 A | 10/1998 | Motoyama | |
| 5,825,947 A | 10/1998 | Sasaki et al. | |
| 5,838,458 A * | 11/1998 | Tsai | 358/402 |
| 5,881,233 A | 3/1999 | Toyoda et al. | |
| 5,907,598 A | 5/1999 | Mandalia et al. | |
| 5,911,776 A * | 6/1999 | Guck | 709/217 |
| 5,933,478 A * | 8/1999 | Ozaki et al. | 379/93.24 |
| 5,953,392 A | 9/1999 | Rhie et al. | |
| 5,956,681 A | 9/1999 | Yamakita | |
| 5,960,165 A | 9/1999 | Kakuno et al. | |
| 5,982,991 A | 11/1999 | Smith | |
| 6,005,677 A | 12/1999 | Suzuki | |
| 6,011,907 A | 1/2000 | Shimura et al. | |
| 6,023,716 A * | 2/2000 | Fujita et al. | 715/530 |
| 6,025,931 A | 2/2000 | Bloomfield | |
| 6,043,802 A | 3/2000 | Gormish | |
| 6,043,904 A | 3/2000 | Nickerson | |
| 6,072,942 A | 6/2000 | Stockwell et al. | |
| 6,141,695 A * | 10/2000 | Sekiguchi et al. | 709/246 |
| 6,157,706 A | 12/2000 | Rachelson | |
| 6,211,972 B1 | 4/2001 | Okutomi et al. | |
| 6,233,318 B1 | 5/2001 | Picard et al. | |
| 6,266,160 B1 | 7/2001 | Saito et al. | |
| 6,330,070 B1 | 12/2001 | Toyoda et al. | |
| 6,343,311 B1 | 1/2002 | Nishida et al. | |
| 6,351,316 B1 | 2/2002 | Saito et al. | |
| 6,374,291 B1 * | 4/2002 | Ishibashi et al. | 709/206 |
| 6,545,768 B1 * | 4/2003 | Matsubara et al. | 358/1.15 |
| 6,587,219 B1 | 7/2003 | Saito et al. | |
| 6,618,749 B1 * | 9/2003 | Saito et al. | 709/207 |
| 6,687,742 B1 * | 2/2004 | Iwazaki | 709/206 |
| 2002/0091777 A1 * | 7/2002 | Schwartz | 709/206 |
| 2002/0091781 A1 * | 7/2002 | Yashiki | 709/206 |
| 2004/0100648 A1 | 5/2004 | Kulakowski | |

FOREIGN PATENT DOCUMENTS

| | | |
|---|---|---|
| EP | 0371607 | 6/1990 |
| JP | 63214057 | 9/1988 |
| JP | 3-207141 | 9/1991 |
| JP | 4-120647 | 4/1992 |
| JP | 4-282934 | 10/1992 |
| JP | 5-014407 | 1/1993 |
| JP | 5-110595 | 4/1993 |
| JP | 5-316144 | 11/1993 |
| JP | 5-344152 | 12/1993 |
| JP | 6-141041 | 5/1994 |
| JP | 6-149505 | 5/1994 |
| JP | 6-217069 | 8/1994 |
| JP | 7-066830 | 3/1995 |
| JP | 7-121457 | 5/1995 |
| JP | 7-131572 | 5/1995 |
| JP | 7-273915 | 10/1995 |
| JP | 8-023345 | 1/1996 |
| JP | 8-130554 | 5/1996 |
| JP | 8-186598 | 7/1996 |
| JP | 8-242326 | 9/1996 |
| JP | 9-116728 | 5/1997 |
| JP | 9-121274 | 5/1997 |
| JP | 9-252317 | 9/1997 |
| JP | 10-91553 | 4/1998 |
| JP | 10117210 | 5/1998 |
| JP | 11-015755 | 1/1999 |
| WO | 97/10668 | 3/1997 |
| WO | 9738523 | 10/1997 |

OTHER PUBLICATIONS

Multimedia Fax-MIME Interworking —Patel, Henderson, Georganas www.mcrlab.uottawa.ca/papers/mmfax.ps.gz.*
Network Working Group G. Parsons Request for Comments: 2306. www.tzi.de/~cabo/pdfrfc/rfc2306.txt.pdf.*
Crew Lossless/Lossy Medical Image Compression - Zandi, al. (1995) ftp.crc.ricoh.com/pub/CREW/DICOM95.ps.gz.*
Interoperable ITV Systems Based On Mheg - Cossmann, Griwodz, Grassel.. (1996) www.cs.utexas.edu/users/mmcn/96/papers/2667-04.ps.gz.*
Supporting Fax Communications Over The Internet - Chong Hui booch.sas.ntu.ac.sg:8080/iccs98c.ps.*
An English Language abstract of JP 9-116728.
An English Language abstract of W.O. 97/38523.
English Language Abstract of JP No. 8-186598.
English Language Abstract of JP No. 7-273915.
English Language Abstract of JP No. 8-130554.
English Language Abstract of JP No. 8-242326.
English Language Abstract of JP No. 9-252317.
English Language Abstract of JP No. 10-117210.
English Language Abstract of JP No. 7-131572.
English Language Abstract of JP No. 10-91553.
English language abstract of JP 5-316144.
English language abstract of JP 4-282934.
English language abstract of JP 63-214057.
English Language Abstract of JP 4-120647.
An article entitled "Internet Extension Message Standard MIME Description" Open Design No. 8, pp. 104-115, which was published on May 10, 1995, along with an English translation of the relevant portion.
Madisetti et al., E—letter on Digital Signal Processing Issue#, Jan. 1995, Georgia Institute of Technology school of Electrical Engineering.
English Language Abstract of JP 9-121274.
English Language Abstract of JP 9-116728.
English Language Abstract of JP 8-242326.
English Language Abstract of JP 6-217069.
English Language Abstract of JP 5-110595.
Enblish Language Abstract of JP 4-282934.
English Language Abstract of JP 5-344152.
English Language Abstract and Partial Translation of JP 6-149505.
English Language Abstract and Partial Translation of JP 7-066830.
English Language Abstract and Partial Translation of JP 7-121457.
English Language Abstract of JP 11-015755.
English Language Abstract of JP 3-207141.
English Language Abstract of JP 8-023345.
English Language Abstract of JP 6-141041.
English Language Abstract of JP 5-014407.

* cited by examiner

INTERNET FACSIMILE AND E-MAIL RECEPTION METHOD

CROSS-REFERENCE TO RELATED APPLICATIONS

This is a continuation of U.S. application Ser. No. 09/099,528, filed Jun. 18, 1998, now U.S. Pat. No. 6,618,749 the entire disclosure of which is expressly incorporated by reference herein in its entirety.

FIELD OF THE INVENTION

The present invention relates to Internet facsimile that transmits/receives image data using the mechanism of E-mall (electronic mail).

The present invention also relates to E-mail reception methods that can recognize the content of received E-mail.

DESCRIPTION OF THE RELATED ART

Facsimile apparatuses which transmit image information over the Internet using the same operations as in general facsimiles have been developed. Since these apparatuses use the Internet for the entire or part of their communication path, this type of facsimile apparatus is called "Internet facsimile."

The Internet facsimile on the receiving side receives data in an E-mail format, converts it to a facsimile data format and prints it out in the same way as for facsimile data received through normal facsimile communications. The Internet facsimile converts the received E-mail data to data in a facsimile data format and sends it to a specified G3 facsimile according to a facsimile communication procedure, functioning thus as a relay apparatus.

Unexamined Japanese Patent Publication No.9-116728 discloses that when the Internet facsimile fails in facsimile transmission, it notifies error information to sender by E-mail (hereafter referred to as "failure mails").

International Publication WO97/38523 discloses that the Internet facsimile notifies the transmission result of relay facsimile data received via a LAN (Local Area Network) to the E-mail address of a facsimile transmission requesting node or administrator node.

When conventional Internet facsimiles on the transmitting side (hereafter referred to as "transmitting node") receive failure mail or E-mail notifying the success/failure of delivery (hereafter referred to as "delivery status notification mail"), they output it without distinguishing it from normal E-mail.

However, said failure mail or delivery status notification mail contains the E-mail data sent from the transmitting node as the return content as it is. Therefore, the transmitted image information is included in the mail in the same text format. Since the transmitting node outputs failure mail or delivery status notification mail as it is, the user receives a considerable volume of unclear and unnecessary information. As a result, the user cannot identify the original document and this will result in a waste of resources such as recording paper.

Furthermore, normal E-mail may contain information that need not always be output. However, conventional Internet facsimiles output the received data one after another no matter what the content may be and output the E-mail likewise, wasting resources such as recording paper.

SUMMARY OF THE INVENTION

The first objective of the present invention is to provide an Internet facsimile apparatus capable of recognizing failure mail and delivery status notification mail.

The second objective of the present invention is to provide an E-mail reception method that recognizes E-mail, capable of recognizing failure mail and delivery status notification mail.

The third objective of the present invention is to provide an Internet facsimile apparatus capable of outputting only necessary information.

The fourth objective of the present invention is to provide an E-mail reception method that outputs E-mail capable of outputting only necessary information.

The present invention provides an Internet facsimile comprising a receiving section for receiving E-mail via a network and a identification section for identifying whether said E-mail is failure mail which notifies an error or not.

The present invention provides an Internet facsimile comprising a receiving section for receiving E-mail via a network and a identification section for identifying whether the E-mail is delivery status notification mail which contains information on the success/failure of delivery of the E-mail or not.

The present invention provides information terminal equipment comprising a unit for transmitting/receiving E-mail via a network and a attaching section for attaching information on the success/failure of delivery of the E-mail to be transmitted.

The present invention provides an E-mail reception method comprising a step of receiving E-mail via a network and a step of identifying whether said E-mail is failure mail notifying an error or not.

The present invention provides an E-mail reception method comprising a step of receiving E-mail via a network and a step of identifying whether the E-mail is delivery status notification mail including information on the success/failure of delivery of the E-mail or not.

The present invention provides an Internet facsimile comprising a receiving section for receiving E-mail via a network, a recognizing section for recognizing the E-mail configuration, a extracting section for extracting only image information from the received data in the case that the E-mail contains no document information and a outputting section for outputting said extracted image information.

The present invention provides an Internet facsimile comprising a receiving section for receiving E-mail via a network, a identification section for identifying whether the received E-mail contains a document fixed message or not, a extracting section for extracting only image information from said E-mail when the E-mail contains a document fixed message and a outputting section for outputting said extracted image information.

The present invention provides en E-mail reception method comprising a step of receiving E-mail via a network, a step of recognizing the E-mail configuration, a step of extracting only image information from said received data when said E-mail contains no document information and a step of outputting said extracted image information.

The present invention provides an E-mail reception method comprising a step of receiving E-mail via a network, a step of identifying whether the received E-mail contains a document fixed message or not, a step of extracting only image information from said E-mail when said E-mail contains a document fixed message and a step of outputting said extracted image information.

DETAILED DESCRIPTION OF THE PREFERRED EMBODIMENTS

Figure 1:
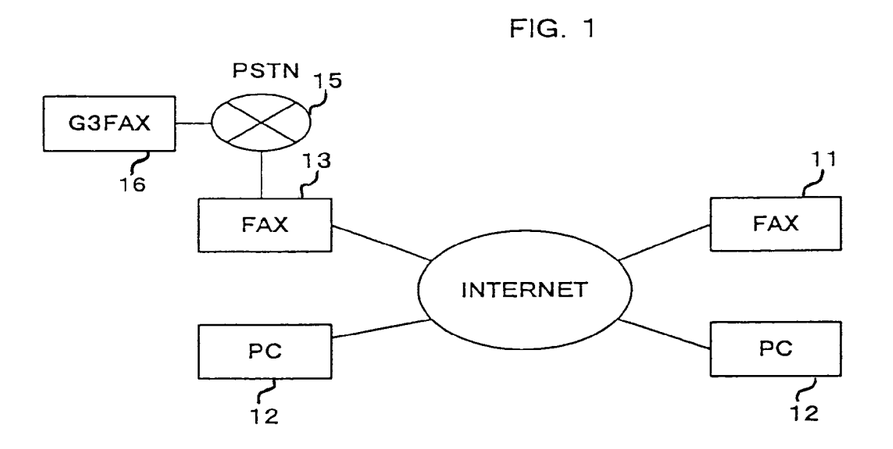
FIG. 1 is a configuration diagram of a network that carries out data transmission using an Internet facsimile related to the embodiment of the present invention.

With reference now to the attached drawings, the embodiments of the present invention are explained in detail below:

FIG. 1 is a network configuration diagram when carrying out data communications using the Internet facsimile in an embodiment of the present invention.

In FIG. 1, the E-mail transmitted from Internet facsimile (IFAX) 11 or personal computer (PC) 12 on the transmitting side is transmitted to IFAX 14 on the receiving side via Internet 13.

Here, the image information read by IFAX 11 on the transmitting side is transmitted as an accompanying file of the E-mail. IFAX 14 on the receiving side converts the received E-mail to a facsimile data format and outputs it to recording paper. Or IFAX 14 transfers the facsimile data to G3 facsimile 16 via PSTN (public switched telephone network) 15.

Figure 2:
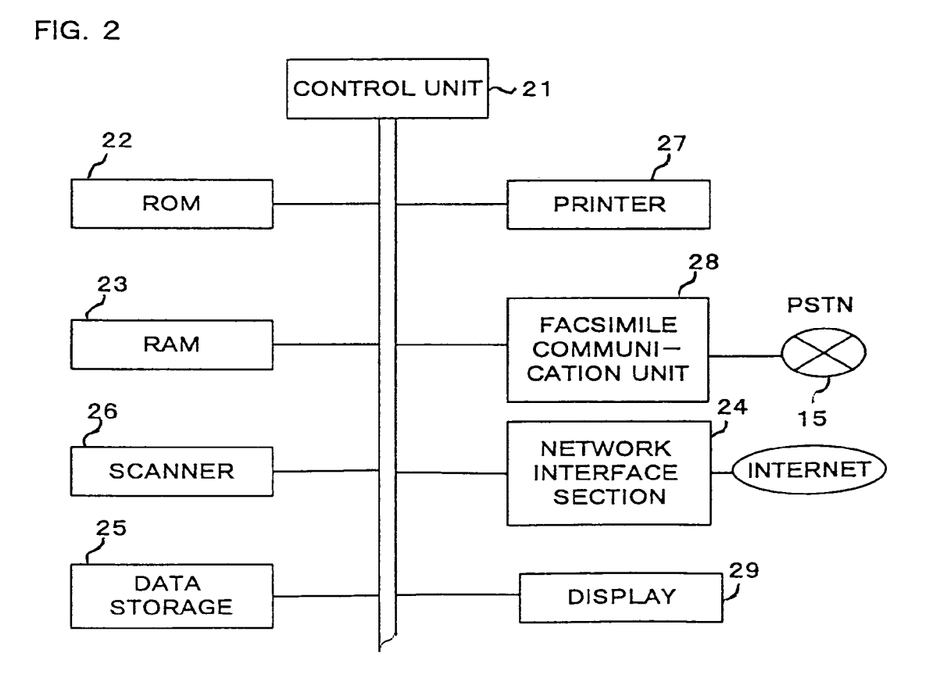
FIG. 2 is a block diagram showing the basic configuration of the Internet facsimile related to the embodiment of the present invention.

Then, the basic configuration of the IFAX in the present embodiment is explained with reference to FIG. 2. FIG. 2 is a block diagram showing the hardware configuration of the IFAX in the present embodiment.

Control unit 21 performs various kinds of control by executing a program. Control unit 21 performs identification of received E-mail data which will be described later, extraction of specific information, format conversion, etc.

ROM 22 is a storage means for storing the program executed by control unit 21. RAM 23 is a storage means used as a data area of the program.

Network interface section 24 controls transmission/reception of data to/from the network. Network interface section 24 can also be connected to the Internet directly. It can also be connected to the Internet via a LAN. If connected via the LAN, network interface section 24 controls data transmission/reception to/from the LAN.

Data storage 25 is a storage means for storing the received data for a time.

Scanner 26 reads original documents. Printer 27 prints data.

Facsimile communication unit 28 transmits/receives data via PSTN 15 according to a facsimile procedure. Facsimile communication unit 28 is equipped with a modem that carries out modulation/demodulation processing. Facsimile communication unit 28 carries out compression or expansion processing for image information.

Display 29 displays various kinds of information and is made up of a liquid crystal display, and so on.

Figure 3:
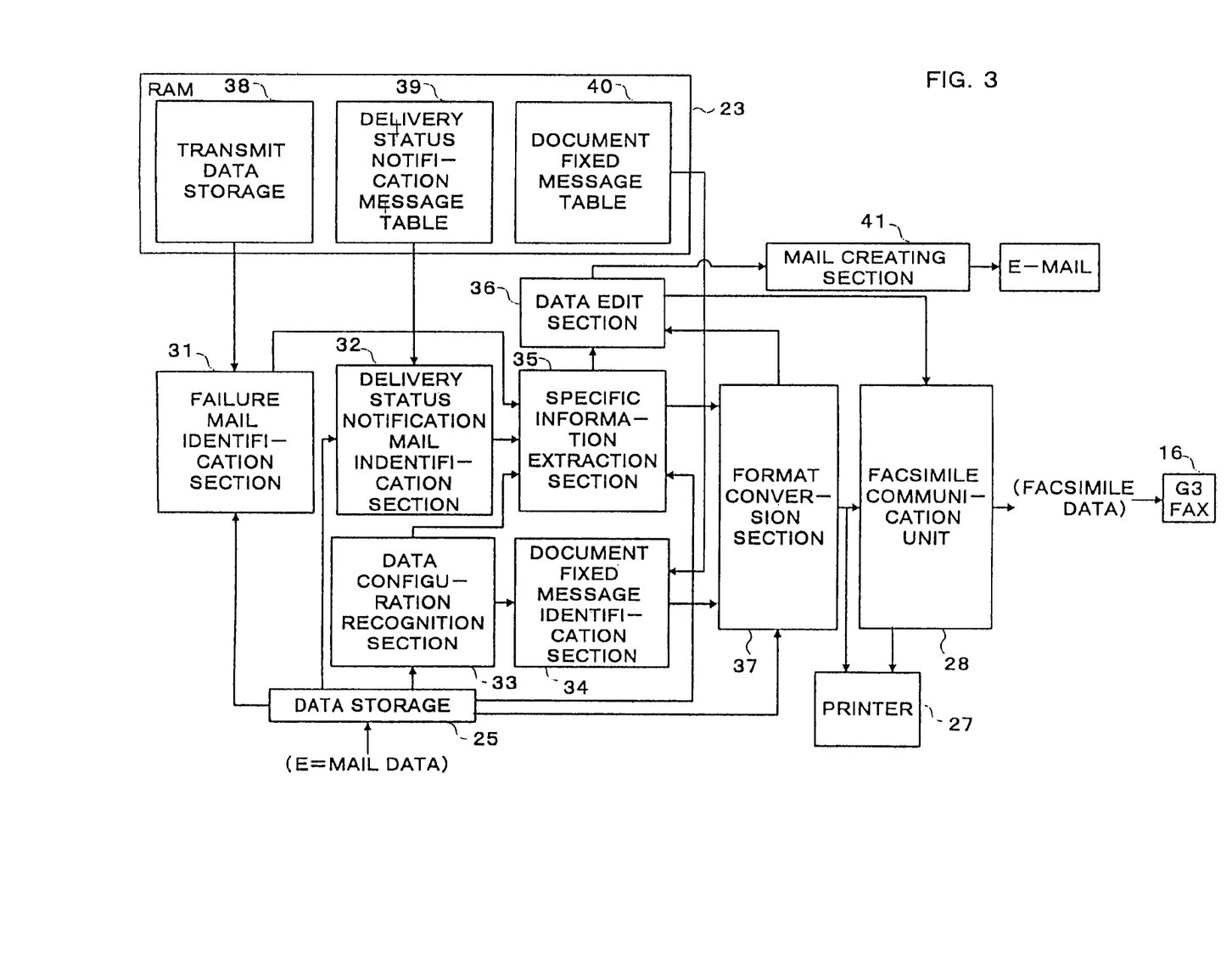
FIG. 3 is a block diagram showing the main configuration of the Internet facsimile related to the embodiment of the present invention.

Then, the functions of the IFAX in the present embodiment are explained with reference to FIG. 3. FIG. 3 is a block diagram showing the functions and data flow of the IFAX in the present embodiment.

The E-mail transmitted from a PC or another IFAX is received by control unit 21 via the Internet according to SMTP (Simple Mail Transfer Protocol) and stored in data storage 25 for a time.

The E-mail data stored in this data storage 25 (hereafter referred to as "received data") is processed by the units explained below.

Failure mail identification section 31 identifies whether the E-mail data stored in data storage 25 is failure mail or not. Delivery status notification mail identification section 32 identifies whether the received data is delivery status notification mail or not. Data configuration recognition section 33 recognizes the data configuration of the received data. Document fixed message identification section 34 identifies whether the document information contains a document fixed message.

Specific information extraction section 35 extracts necessary data from the received data based on the identification result if necessary. Data edit section 36 edits the extracted data if necessary.

Format conversion section 37 converts E-mail format data to facsimile data. Format conversion section 37 converts the received data to facsimile data and at the same time converts the data extracted by specific information extraction section 35 to facsimile data. Here, the facsimile data refers to an image file that can be handled by a facsimile apparatus. It is an image compression file such as an MH file.

Format conversion section 37 expands accompanying files included in the E-mail data. That is, binary files such as image files are converted to character data, i.e., text codes and attached to E-mail. Format conversion section 37 decodes the accompanying files to binary files.

Transmit data storage 38 provided for RAM 23 stores the transmitted E-mail (hereafter referred to as "transmit data"). This transmit data is read by failure mail recognition section 31. Delivery status notification message table 39 stores a message regarding the success/failure of delivery (hereafter referred to as "delivery status notification message") contained in the E-mail notifying the success/failure of delivery (hereafter referred to as "delivery status notification mail") transmitted by the IFAX on the receiving side. This message is used for recognition by delivery status notification mail recognition section 32. Document fixed message table 40 stores the document fixed messages used by document fixed message identification section 34. The document fixed messages will be described later.

The following description gives details of the processing of received data in the IFAX configured as shown above.

Firstly, its output operation when the received data is failure mail is explained.

The identification that the received data is failure mail is performed by failure mail recognition section 31. Here, the failure mail has the same configuration as that of normal E-mail and it is difficult to judge whether the received data is failure mail or normal E-mail based an its configuration only. The identification is carried out, therefore, by a collation between the received data and the transmit data stored in transmit data storage 38 on RAM 23.

Figure 4:
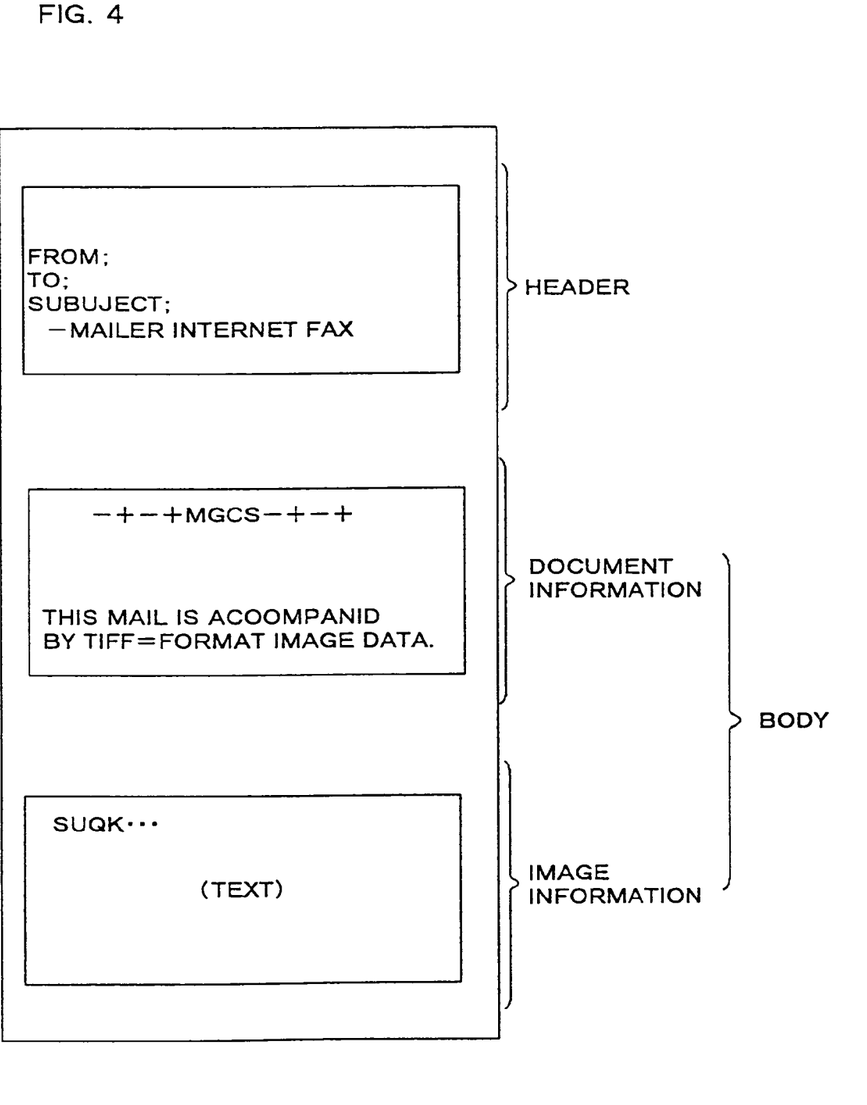
FIG. 4 is a schematic view of normal E-mail transmitted by the Internet facsimile related to the embodiment of the present invention.
Figure 5:
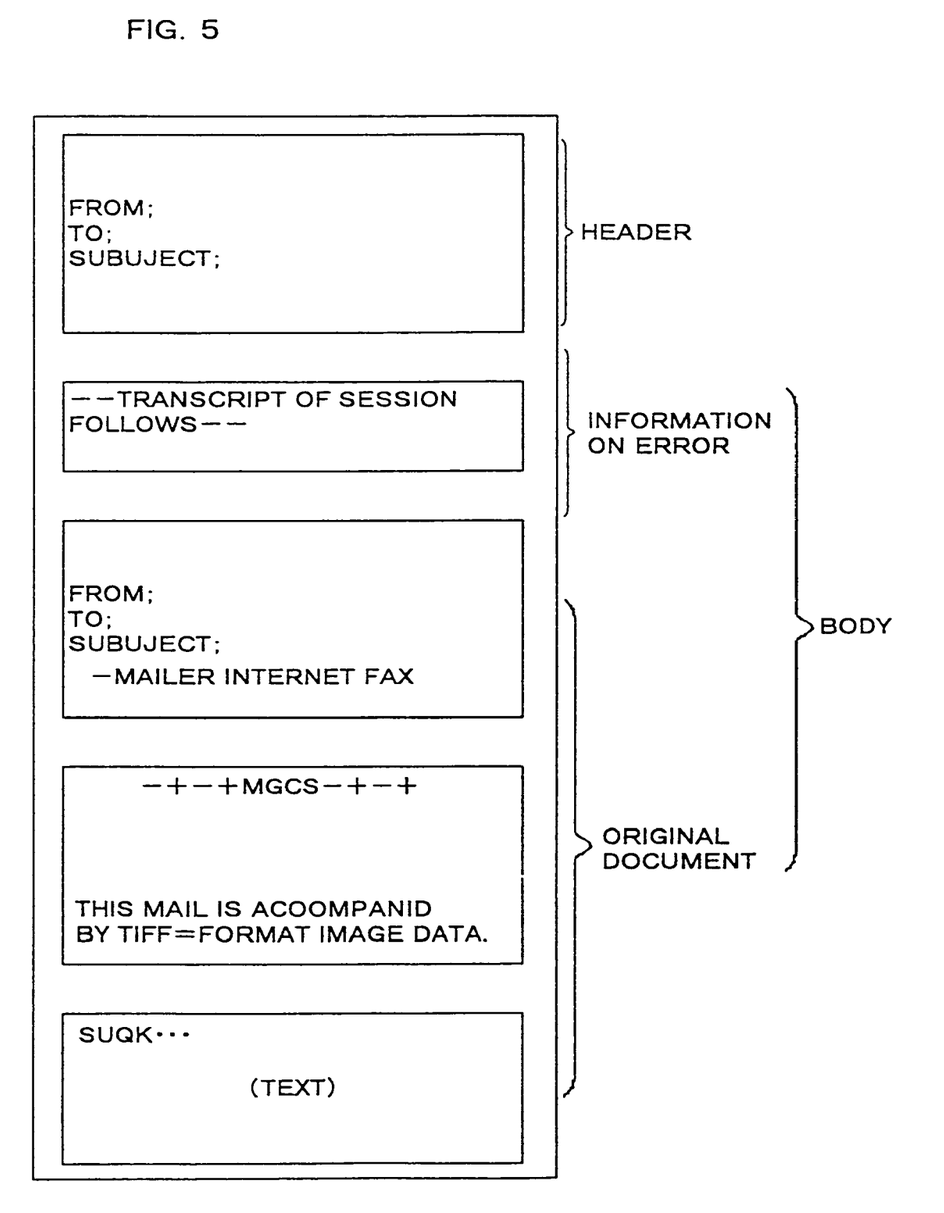
FIG. 5 is a schematic view of failure mail received by the Internet facsimile related to the embodiment of the present invention.

A schematic view of the transmit data from the IFAX in this collation is shown in FIG. 4. FIG. 5 shows a schematic view of the failure mail received by the IFAX.

As shown in FIG. 4, the header of the transmit mail contains a fixed message such as [Mailer:Internet FAX] (hereafter referred to as "header fixed message"). Information in the body of E-mail includes a message, for example, "this mail is accompanied by TIFF-format image data," that is, a "document fixed message." The document fixed message is a message specific to the IFAX attached to the document information only when the IFAX transmits E-mail data. The document fixed message is written in text codes in the E-mail body. The first portion of the image information of the body includes a fixed code (hereafter referred to as "image data fixed code") such as "SUqk . . . ".

As shown in FIG. 5, the failure mail body contains error-related information, transmit mail header and failure mail body. This also includes a header fixed message, document fixed message and image information fixed code.

Failure mail identification section 31 collates the header fixed message, document fixed message and image information fixed code, and if all of them match, it judges that the received data is failure mail.

Once the received data is identified as failure mail, specific information extraction section 35 extracts the error information and the image information of the original document from the received data. The extracted data is converted to facsimile data by format conversion section 37. The converted facsimile data is edited by data edit section 36 so that it may fit in one page. The entire or part of the image information of the original document can be extracted from the received data.

The edited data is modulated by facsimile control section 28 and transmitted to G3 facsimile 16 via PSTN 15 as shown in FIG. 1.

Figure 6:
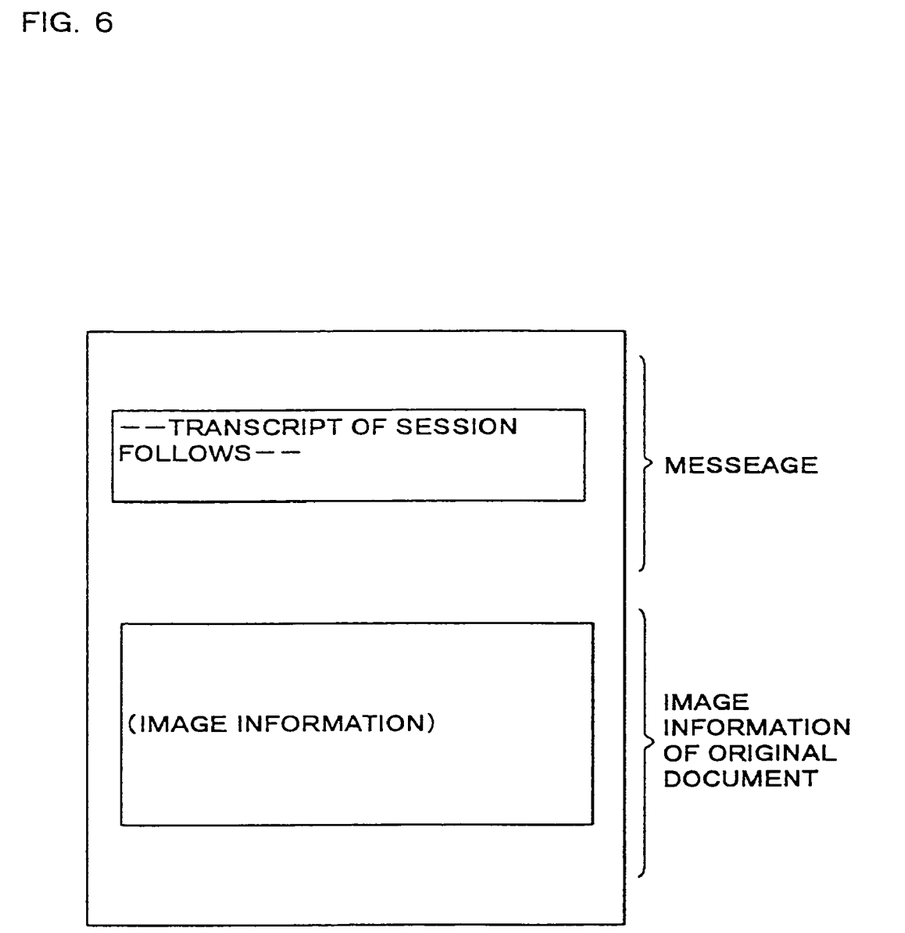
FIG. 6 is a schematic view of failure mail output from the Internet facsimile related to the embodiment of the present invention.

FIG. 6 is a schematic view of the failure mail output from the IFAX in said embodiment. It saves recording paper by editing the error information and original document on one page and outputting it. It also allows the receiver to know wheat kind of error caused the transmission of the document to fail.

In addition to the transfer to G3 facsimile 16, the output of the edited data includes printing of the data edited by printer 27. That is, it is possible to print out the edited data by printer 27, by using text data as it is while converting the image information character data to binary data by format conversion section 37. It is also possible to convert the edited data to facsimile data such as an MH file by format conversion section 37, expand it by facsimile communication unit 28 and print it out by printer 27.

It is also possible for mail creating section 41 to create E-mail by attaching a message stating, for example, that failure mail has been received to the edited data and send it to the administrator, etc. It is also possible to simply send E-mail stating that failure mail has been received.

Furthermore, display 29 shown in FIG. 2 may also display a message stating that failure mail has been received.

Secondly, the output operation in the case that the received data is delivery status notification mail is explained.

The identification that the received data is delivery status notification mail is carried out in delivery status notification mail identification section 32 by the fact that the received data contains the same delivery status notification message stored in delivery status notification message table 38 in RAM 23.

Figure 7:
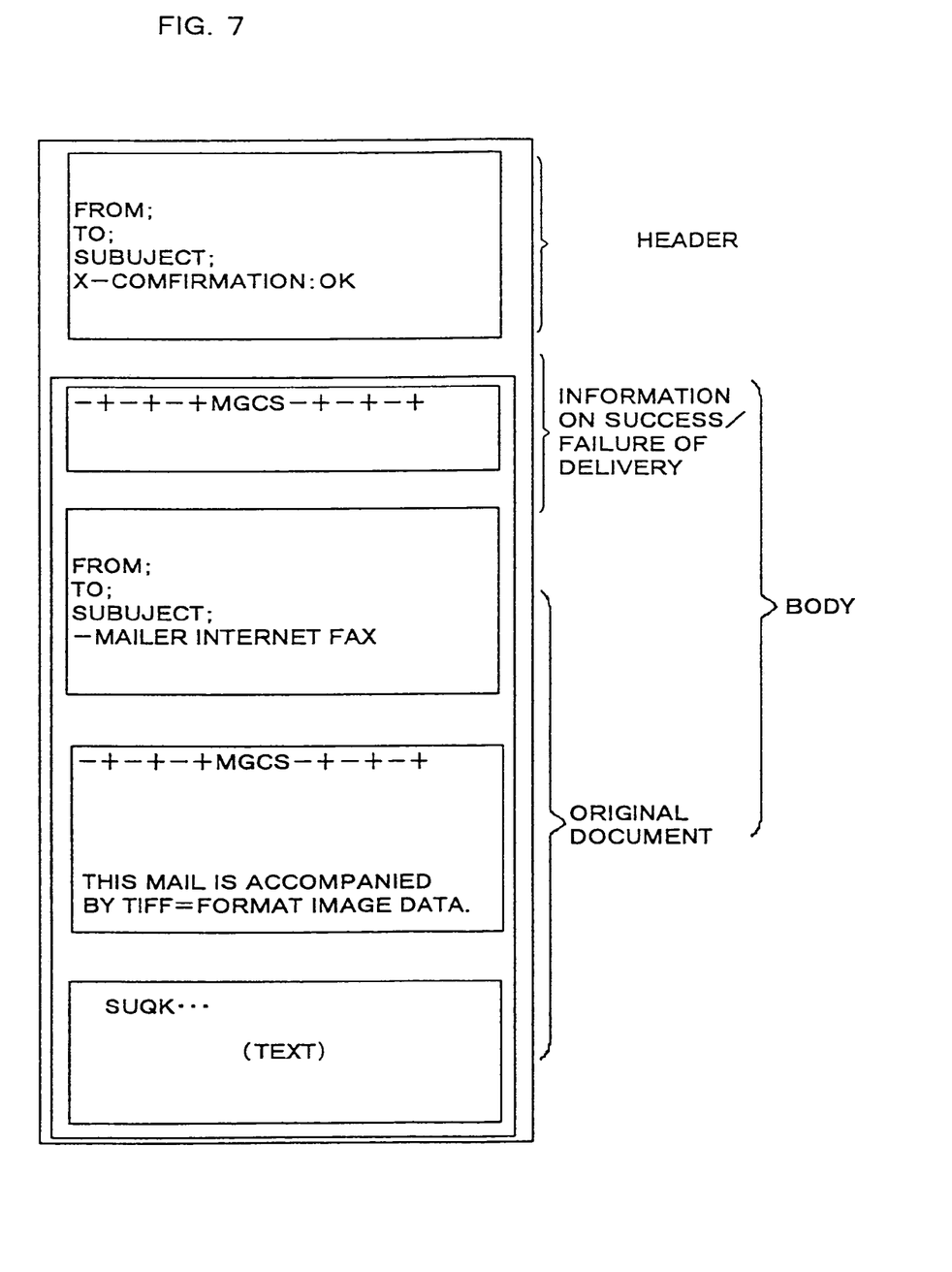
FIG. 7 is a schematic view of delivery status notification mail format received by the Internet facsimile related to the embodiment of the present invention.

FIG. 7 is a schematic view of delivery status notification mail in said embodiment. As shown in FIG. 7, the delivery status notification mail consists of the header and body. The body consists of information on the success/failure of communication, the header and the body of the original mail. The image file attached to the body of the original mail is character data.

The delivery status notification mail has the same configuration as that of normal E-mail and it is difficult to judge whether the received data is delivery status notification mail or normal E-mail based on the configuration only. Therefore, the transmitting side of delivery status notification mail attaches a delivery status notification message indicating that the data received such as [X-Confirmation:OK] is delivery status notification mail to the header. On the other hand, the IFAX on the receiving side stores the delivery status notification message in delivery status notification message table 39 in RAM 23.

Delivery status notification mail identification section 32 collates this delivery status notification message and if the same message is included in delivery status notification message table 39, it judges that the received data is delivery status notification mail Once the received data is identified as delivery status notification mail, specific information extraction section 35 extracts information on the success/failure of delivery and the image information of the original document from the received data. The extracted data is converted to facsimile data by format conversion section 37. The converted facsimile data is edited by data edit section 36 so that it may fit in one page.

The edited data is modulated by facsimile control section 28 and transmitted to G3 facsimile 16 via PSTN 15 as shown in FIG. 1.

Figure 8:
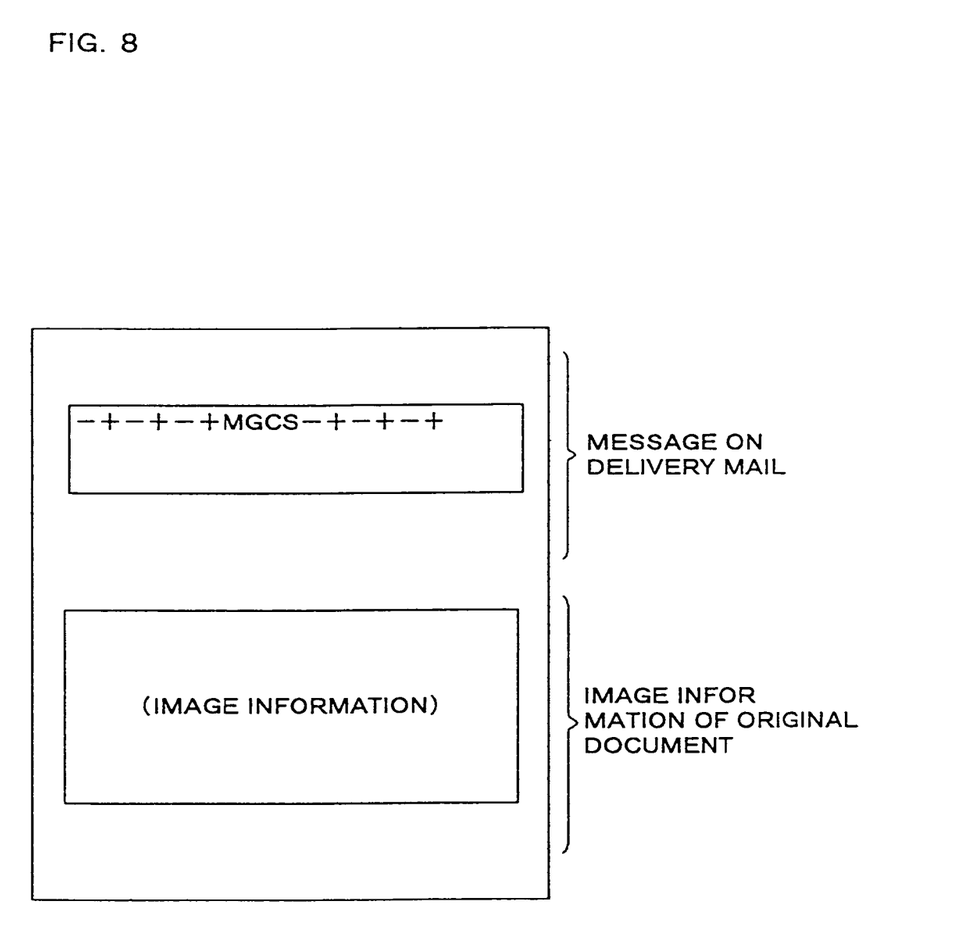
FIG. 8 is a schematic view of delivery status notification mail output from the Internet facsimile related to the embodiment of the present invention.

FIG. 8 is a schematic view of the delivery status notification mail output from the IFAX in said embodiment. Editing the information on the success/failure of delivery and the original document on one page and outputting it will prevent a waste of recording paper and allow the receiver to know the success/failure of delivery of each document.

The output method for the edited data includes printing of the data edited by printer 27. It is also possible for mail creating section 41 to create E-mail based on the edited data and transmit it to the administrator, etc. Furthermore, the delivery status notification message can also be displayed on display 29 shown in FIG. 2.

Thirdly, the output operation in the case that normal E-mail is received is explained below.

First, data configuration recognition section 33 recognizes the data configuration of the received data such as header information, document information and image information.

If the received data contains document information, outputting only the header aside from the image information that follows is a waste of recording paper, and thus specific information extraction section 35 extracts only the image information of the document converted to a text format. The extracted data is converted by format conversion section 37 to facsimile data. The converted facsimile data is output from facsimile communication unit 28. Outputting only image information allows operation similar to normal facsimile operation. Therefore, it not only saves resources such as recording paper but also shortens the communication time.

If the received data contains document information, document fixed message identification section 34 judges whether the document information of the received data contains any document fixed message or not.

Here, when transmitting the image information by E-mail, the IFAX may attach a message before the image information indicating that image information is attached thereto and transmit it. It is difficult to change this message to suit the image information to be sent, and thus the aforementioned document fixed message is used. In this case, the document information is a mere document fixed message and needs not be output, and outputting it is nothing but a waste of recording paper.

Therefore, if the document information of the received data contains a document fixed message, specific information extraction section 35 extracts only the image information. The extracted data is converted by format conversion section 37 to facsimile data. The converted facsimile data is output from facsimile communication unit 28. Outputting only image information allows operations similar to normal facsimile operation. Therefore, the header and document fixed message are not output every time, contributing not only to saving resources such as recording paper but also to shortening the output time.

On the other hand, if the document information of the received data contains no document fixed message, the entire received data is converted by format conversion 37 to facsimile data. The converted facsimile data is output from facsimile communication unit 28.

Then, the flow of the output operation of the data received by the IFAX in the present embodiment is explained below.

Figure 9:
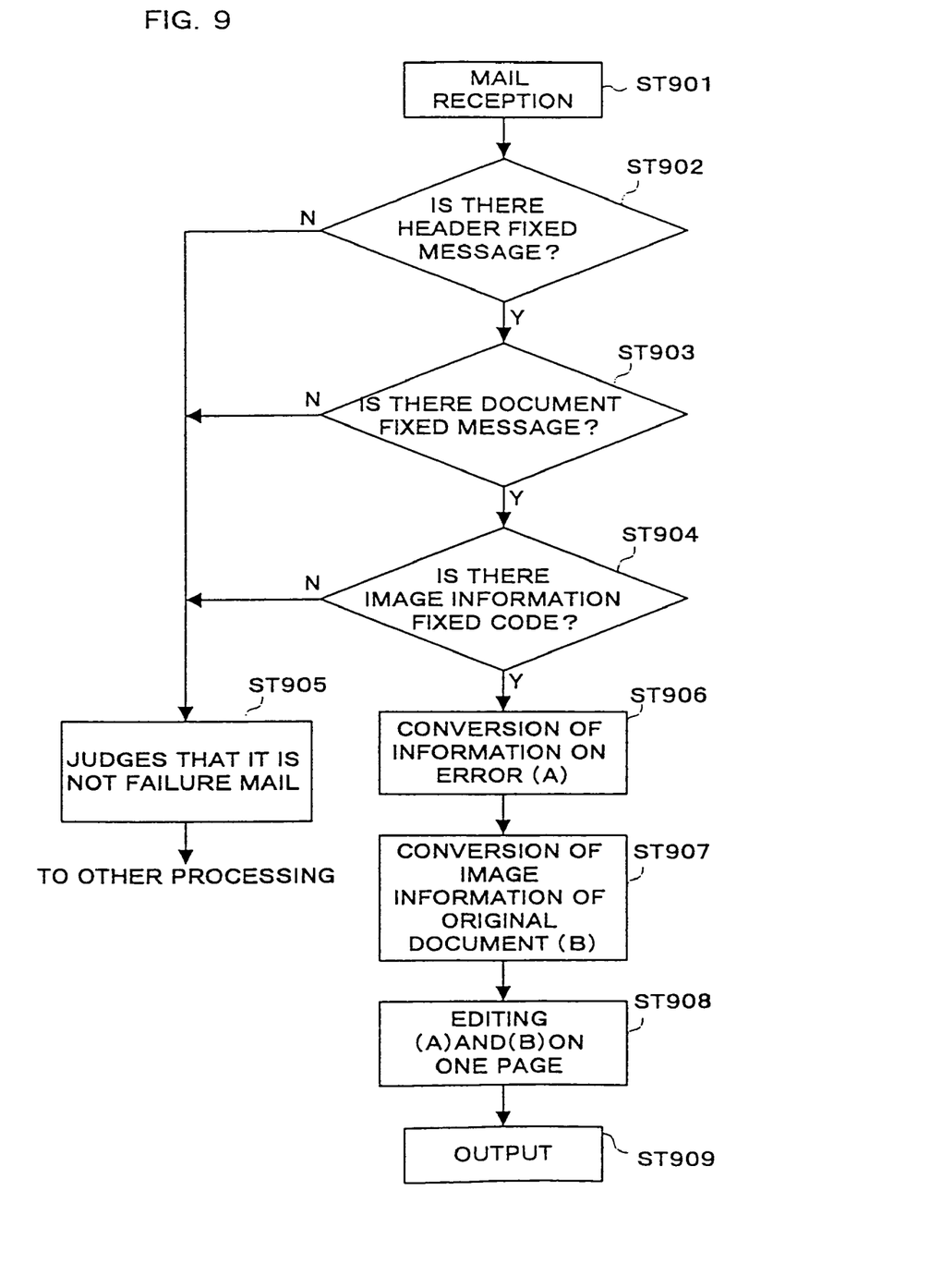
FIG. 9 is a flow diagram of failure mail output from the Internet facsimile related to the embodiment of the present invention.

Firstly, the flow of the output operation in the case that the transmit content is not delivered and failure mail is sent to the IFAX of the present invention is explained with reference to FIG. 9. FIG. 9 is a flow diagram of failure mail output from the IFAX in said embodiment.

The IFAX receives E-mail from network interface section 24 and then stores it in data storage 25 (ST901). Failure mail identification section 31 judges whether the received data contains any header fixed message or not by collating the received data with the transmit data stored in transmit data storage 38 (ST902). If any header fixed message is found, it judges whether there is any document fixed message or not (ST903). If there is any document fixed message, it judges whether there is any image information fixed code (ST904).

If any one of header fixed message, document fixed message or image information fixed code is missing in the received data, it judges that the received data is not failure mail (ST905).

If the received data contains all of header fixed message, document fixed message and image-information fixed code, it judges that the received data is failure mail and carries out the following processing:

It converts the error information in the received data to facsimile data (ST906), converts the image information of the original document converted to character data to facsimile data by format conversion section 37 (ST907), synthesizes the converted error information and the image information of the original document on one page of recording paper (ST908) and outputs it from facsimile communication unit 28 (ST909).

Figure 10:
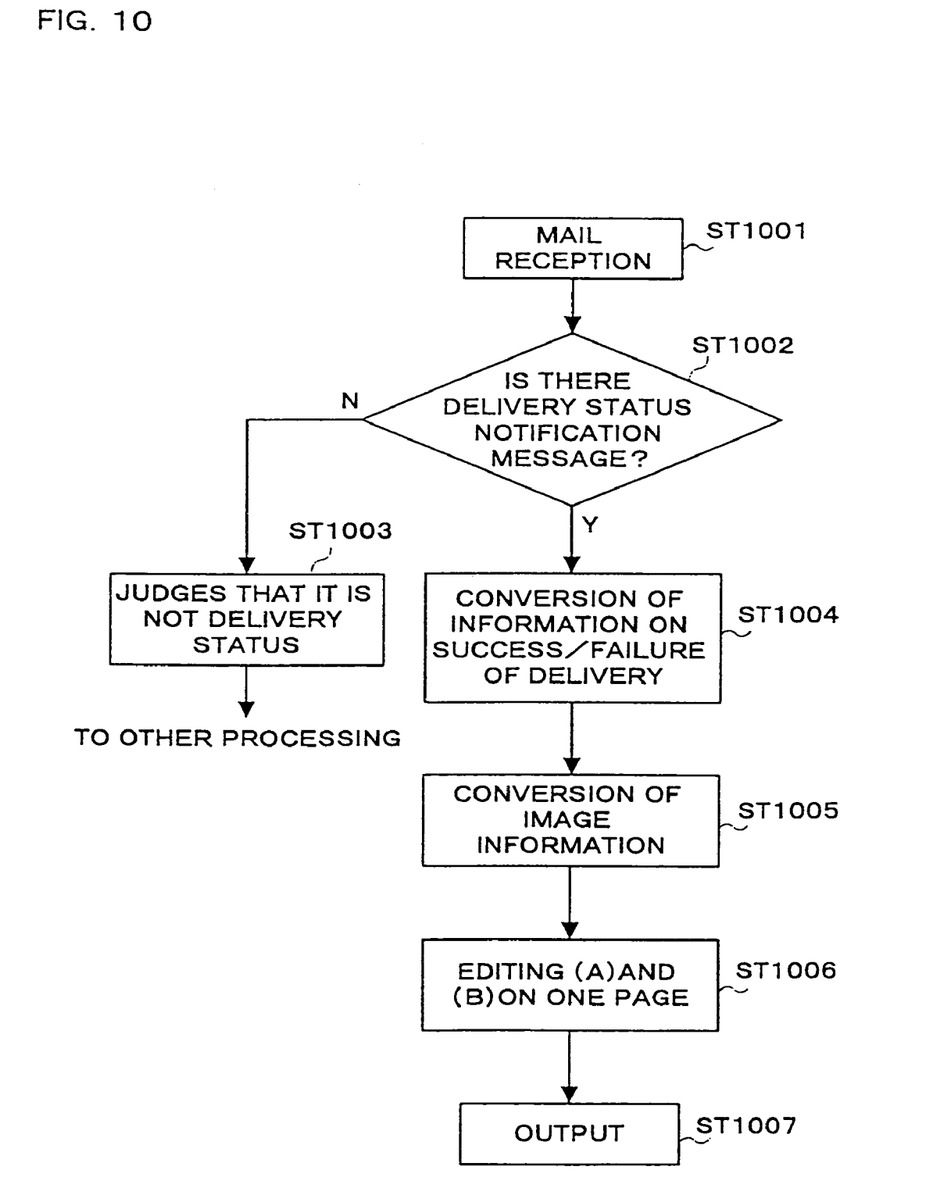
FIG. 10 is a flow diagram of delivery status notification mail output from the Internet facsimile related to the embodiment of the present invention.

Secondly, the flow of the output operation in the case that the transmit content is delivered and delivery status notification mail is sent to the IFAX of the present invention is explained with reference to FIG. 10. FIG. 10 is a flow diagram of the delivery status notification mail output from the IFAX in the present embodiment.

The IFAX receives E-mail from network interface section 24 and then stores it in data storage 25 (ST1001). Delivery status notification mail recognition section 32 judges whether the received data contains any delivery status notification message or not by collating the received data with the data stored in delivery status notification message table 39 (ST1002). If there is no delivery status notification message, the IFAX judges that the received data is not delivery status notification mail (ST1003) and carries out different processing.

If the received data contains a delivery status notification message, the IFAX judges that the received data is delivery status notification mail and carries out the following processing:

The information on the success/failure of delivery of the received data is converted by format conversion section 37 to facsimile data (ST1004). The image information of the original document converted to a text format, that is, character data is converted by format conversion section 37 to facsimile data (ST1005). The converted information on the success/failure of delivery and part of the image information of the original document is edited on one page (ST1006) and output from facsimile communication unit 28 (ST1007).

Figure 11:
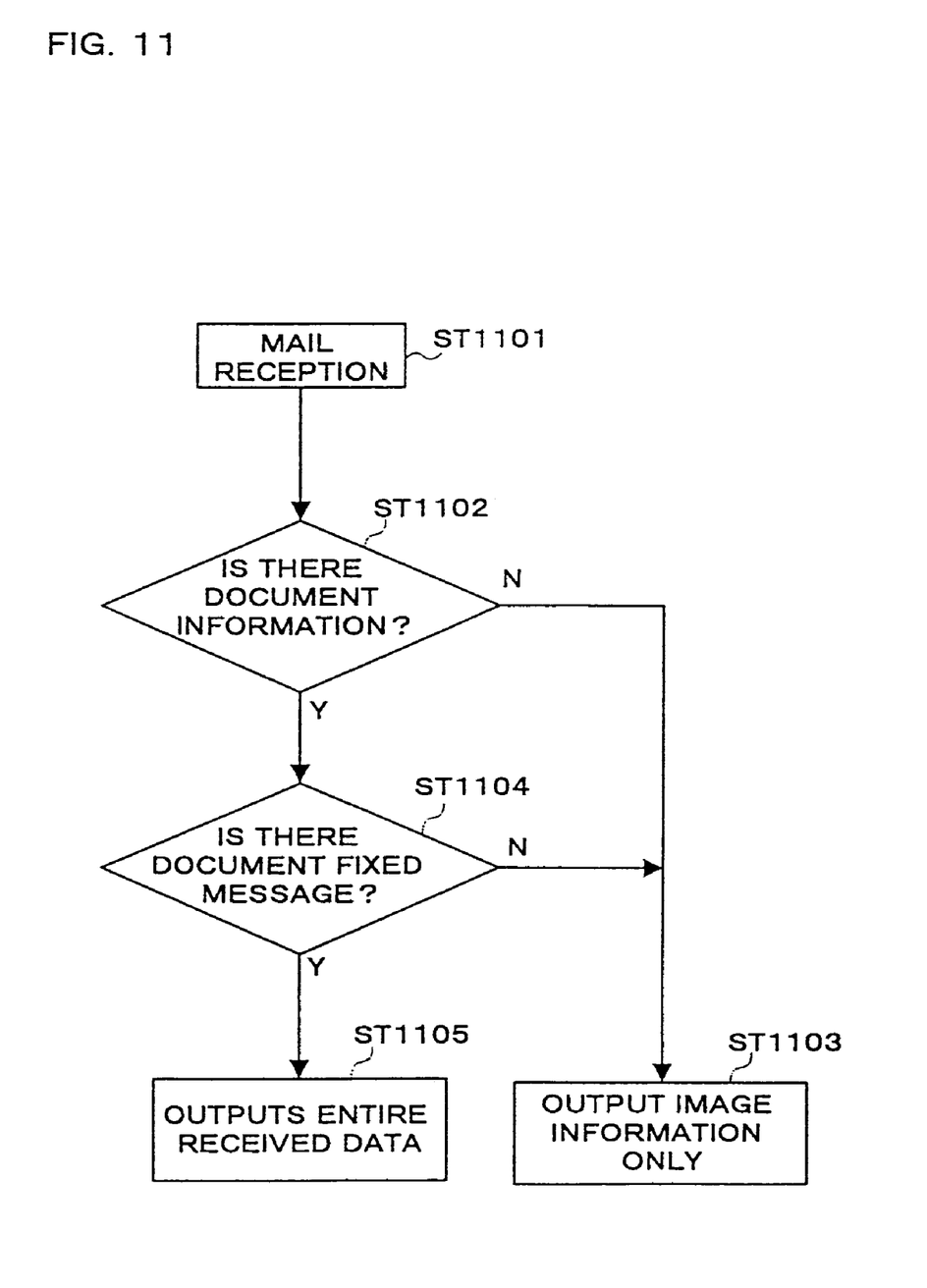
FIG. 11 is a flow diagram of E-mail output from the Internet facsimile related to the embodiment of the present invention.

Thirdly, the flow of the output operation in the case that normal E-mail is received and the output content is changed according to the configuration of the received data is explained with reference to FIG. 11. FIG. 11 is a flow diagram of outputting the E-mail received by the IFAX in said embodiment.

The IFAX receives E-mail from network interface section 24 and then stores it in data storage 25 (ST1101). Then, it judges whether the body of the received data contains any document information (ST1102). If there is no document information, it does not output the header of the received data but outputs only the image information (ST1103).

It there is some document information, it judges whether the document information contains any document fixed message or not (ST1104). If there is no document fixed message, the entire received data is output (ST1105).

If there is some document fixed message, the header and document information of the received data are not output, but only image information is output (ST1103).

As explained above, the IFAX related to the present embodiment can distinguish failure mail or delivery status notification mail from normal E-mail and if special E-mail is received, predetermined operations such as a transfer of the received data can be performed.

Furthermore, the IFAX of the present embodiment can extract only necessary information from the received data according to the type and configuration of the received E-mail data, edit it if necessary and output it, thus saving resources such as recording paper.

In the present embodiment, the entire transmit data is stored in transmit data storage 38 to identify failure mail. However, it is also possible to extract part of the transmit data and use it as information to identify receive mail. Said information includes the information contained in the header such as the transmit source address (From:), transmit destination address (To:), date (Date:), subject name (Subject) and message ID (Message-ID:), etc. and information contained in the body such as signature.

The above explanation has focused on the IFAX, but the present invention is also applicable to other E-mail apparatuses. For example, with a PC which incorporates or connects to a fax modem, it can recognize whether received E-mail is failure mail or delivery status notification mail. It can also extract necessary information from the received E-mail and transmit the data edited according to need to a G3 facsimile through facsimile communication. Furthermore, it has the ability to print the edited data through a printer connected to the PC or display it on a display screen or E-mail it.

It is also possible to add to the existing G3 facsimile such options as a network interface section and a network compatible unit that carries out E-mail recognition, extraction of information and E-mail editing, etc.

If such a network interface section and a network adapter that carries out E-mail recognition, extraction of information and E-mail editing are connected to the existing G3 facsimile, it can also demonstrate the functions equivalent to those of the IFAX related to the present embodiment.

In the present invention, the IFAX on the receiving side also includes a means for attaching to reply E-mail a message that allows the IFAX on the transmitting side to recognize it as delivery status notification mail. This allows the IFAX on the receiving side related to said embodiment to easily distinguish normal E-mail from delivery status notification mail.

What is claimed is:

1. An Internet facsimile apparatus for receiving e-mail data and connected to a computer network, the Internet facsimile apparatus comprising:
    an e-mail receiver that receives e-mail data transmitted via the computer network, the e-mail data including a header, document information and image information;
    a determiner that determines whether or not the document information contains predetermined data indicating that the e-mail data was transmitted from an Internet facsimile apparatus; and
    a printer that prints the entire received e-mail data when said determiner determines that the document information does not contain the predetermined data, and that prints only the image information when said determiner determines that the document information contains the predetermined data.

2. The Internet facsimile apparatus according to claim 1, a content of the predetermined data is "this mail is accompanied by TIFF-format image data".

3. The Internet facsimile apparatus according to claim 1, further comprising:
    a document information determiner that determines whether or not the document information is contained in the e-mail data received by said e-mail receiver,
    wherein said printer prints only the image information when said document information determiner determines that the document information is not contained in the e-mail data.

4. The Internet facsimile apparatus according to claim 1, said predetermined data indicating that the mail is accompanied by TIFF-format image data.

5. The Internet facsimile apparatus according to claim 1, said determiner being configured to control the printer to print the e-mail data including a header, document information and image information when a TIFF file is not attached to the e-mail and being configured to control the printer to print only the image file when a TIFF file is attached to the e-mail.

6. A method for receiving e-mail data, using an Internet facsimile apparatus connected to a computer network, the method comprising:
    receiving e-mail data transmitted via the computer network, the e-mail data including a header, document information and image information;
    determining whether or not the document information contains predetermined data indicating that the e-mail data was transmitted from an Internet facsimile apparatus;
    printing the entire received e-mail data when the determining determines that the document information does not contain the predetermined data; and
    printing only the image information when the determining determines that the document information contains the predetermined data.

7. The method according to claim 6, a content of the predetermined data is "this mail is accompanied by TIFF-format image data".

8. The method according to claim 6, the determining controlling printing of the e-mail data including a header, document information and image information when a TIFF file is not attached to the e-mail and controlling printing of only the image file when a TIFF file is attached to the e-mail.

9. The method according to claim 6, further comprising:
    determining whether or not the document information is contained in the received e-mail data,
    wherein the printing prints only the image information when the determining determines that the document information is not contained in the e-mail data.

10. The method according to claim 6, the predetermined data indicating that the mail is accompanied by the TIFF-format image data.

* * * * *